US011800964B2

(12) United States Patent
Bernet et al.

(10) Patent No.: US 11,800,964 B2
(45) Date of Patent: Oct. 31, 2023

(54) TURBIDITY SENSOR AND WATER-BEARING DOMESTIC APPLIANCE EQUIPPED THEREWITH

(71) Applicant: emz-Hanauer GmbH & Co. KGaA, Nabburg (DE)

(72) Inventors: Andreas Bernet, Pegnitz (DE); Martin Brabec, Nabburg (DE); Manfredi Signorino, Wackersdorf (DE)

(73) Assignee: EMZ-HANAUER GMBH & CO. KGAA, Nabburg (DE)

( * ) Notice: Subject to any disclaimer, the term of this patent is extended or adjusted under 35 U.S.C. 154(b) by 348 days.

(21) Appl. No.: 17/151,429

(22) Filed: Jan. 18, 2021

(65) Prior Publication Data

US 2021/0219813 A1    Jul. 22, 2021

(30) Foreign Application Priority Data

Jan. 20, 2020  (DE) ..................... 10 2020 000 316.8

(51) Int. Cl.
*A47L 15/42*  (2006.01)
*D06F 34/22*  (2020.01)
*G01N 21/53*  (2006.01)

(52) U.S. Cl.
CPC .......... *A47L 15/4297* (2013.01); *D06F 34/22* (2020.02); *G01N 21/534* (2013.01); *A47L 2401/10* (2013.01)

(58) Field of Classification Search
CPC .. A47L 15/4297; A47L 2401/10; A47L 15/46; D06F 34/22; G01N 21/534;

(Continued)

(56) References Cited

U.S. PATENT DOCUMENTS 7,414,237 B2    8/2008  Richwin et al.
2004/0047770 A1  3/2004  Schawaller et al.
(Continued)

FOREIGN PATENT DOCUMENTS

| CN | 102313736 A | 1/2012 |
| CN | 208140551 U | 11/2018 |
| DE | 60301821 T2 | 8/2006 |
| EP | 1784324 B1 | 4/2008 |

(Continued)

OTHER PUBLICATIONS

Office Action received in related Korean Patent Application No. 10-2021-0007507, dated Mar. 23, 2022, 21 pages.

(Continued)

*Primary Examiner* — Md M Rahman
(74) *Attorney, Agent, or Firm* — Hayes Soloway PC (57) ABSTRACT

A turbidity sensor for a water-bearing domestic appliance includes a sensor housing having a housing main part and two housing projections protruding from the housing main part side by side and at a distance from one another, where the two housing projections delimit between them a measuring channel for a liquid to be measured. One of the housing projections emits a measuring light beam along a measuring path which runs transversely through the measuring channel to the other housing projection. The measuring path crosses the measuring channel in the channel longitudinal direction remote from a point of smallest channel width of the measuring channel or the measuring channel has a constriction at a longitudinal distance from its longitudinal midpoint, at which constriction the channel width is smaller than in a region of a longitudinal midpoint.

7 Claims, 4 Drawing Sheets

(58) Field of Classification Search
CPC ........ G01N 21/59; G01N 21/01; G01N 21/55; G01N 2021/0112; G01N 2021/555; G01N 2021/558; G01N 21/5907; G01N 15/06
USPC ........................................................ 356/442
See application file for complete search history.

(56) References Cited

U.S. PATENT DOCUMENTS

| | | |
|---|---|---|
| 2009/0231581 A1 | 9/2009 | Han et al. |
| 2012/0001099 A1 | 1/2012 | Schenkl et al. |
| 2012/0162652 A1* | 6/2012 | Schenkl ............... G01N 21/534 |
| | | 356/432 |
| 2012/0325657 A1 | 12/2012 | Yamamoto et al. |

FOREIGN PATENT DOCUMENTS

| | | | | |
|---|---|---|---|---|
| EP | 2242626 A2 * | 10/2010 | ............... | B28B 1/00 |
| JP | H06118177 A | 4/1994 | | |
| JP | 2000167438 A | 6/2000 | | |
| JP | 2008191119 A | 8/2008 | | |
| KR | 20090098453 A | 9/2009 | | |
| KR | 101692677 B1 | 1/2017 | | |
| WO | 2004101878 A1 | 11/2004 | | |
| WO | 2009087038 A2 | 7/2009 | | |
| WO | WO-2019057621 A1 * | 3/2019 | ........... | A61B 5/0876 |

OTHER PUBLICATIONS

DE Examination Report in co-pending application DE 10 2020 000 316.8, dated Oct. 14, 2020.

* cited by examiner

TURBIDITY SENSOR AND WATER-BEARING DOMESTIC APPLIANCE EQUIPPED THEREWITH

BACKGROUND OF THE INVENTION

1. Field of the Invention

The present invention relates generally to a turbidity sensor for a water-bearing domestic appliance.

2. Description of the Prior Art

Turbidity sensors are used in water-bearing domestic appliances to determine the turbidity of a water-containing liquid. In the case of a dishwasher, for example, the water-containing liquid is the dishwater which collects in a pump sump beneath a dishwashing chamber, or in the case of a laundry washing machine it is the washing water which collects in the bottom of a wash tub. Depending on the operating phase of the domestic appliance, the liquid can contain, in addition to water, also one or more chemical cleaning substances. The amount of foreign substances present in the water can be concluded from the measured turbidity of the water-containing liquid, wherein the term foreign substances is to be understood as meaning both contaminants coming from articles to be cleaned (e.g. laundry, dishes) and cleaning substances added for cleaning purposes. The measured turbidity can be an influencing factor for controlling the operation of the domestic appliance. For example, the addition of a cleaning agent or the duration of a cleaning program can be controlled in dependence on the measured turbidity.

For the prior art relating to conventional turbidity sensors, reference is made, for example, to DE 10 2008 056 701 A1 and DE 10 2011 102 627 A1.

Conventional turbidity sensors for domestic washing machines or domestic dishwashers have a sensor housing which is inserted into a mounting opening in a delimiting wall of a wet chamber (e.g. liquor container, pump sump) of the domestic appliance and has two finger-like housing projections which project into the wet chamber. The housing projections delimit between them a measuring space, which during operation of the domestic appliance is flushed by the liquid to be measured. For measuring the turbidity of this liquid, the turbidity sensor emits a measuring light beam which emerges into the measuring space at one of the housing projections and, after crossing the measuring space, enters the other of the housing projections again. Depending on the turbidity of the liquid in the measuring space, the measuring light beam is thereby attenuated to a greater or lesser extent. The degree of turbidity of the liquid can be concluded from the extent of the attenuation. The extent of the attenuation can be determined, for example, by considering the ratio of radiated light intensity to received light intensity of the measuring light beam.

A problem associated with conventional turbidity sensors is the adhesion of bubbles to the outside surface of the sensor housing and in particular to the outside surfaces of the housing projections of the sensor housing. Bubbles on the outside surface of the sensor housing can interfere with the light propagation of the measuring light beam and in particular result in undesirable scattering of the measuring light beam. There is therefore the risk of falsified measuring results owing to bubble adhesion to the outside surface of the sensor housing. Bubble formation in the liquid to be tested can be promoted especially by the presence of chemical cleaning substances, which result in increased foam formation. Turbulent movements of the liquid itself can, however, also lead to the formation of air bubbles in the liquid.

The tendency of bubbles to adhere to the outside surface of the sensor housing depends on the wettability (hydrophilicity) of the outside surface of the sensor housing. In order to improve the hydrophilicity of a surface, it is in principle known to carry out so-called surface activation. Known activation methods include flame treatment, plasma treatment with a noble gas plasma and also corona treatment. A disadvantage of such methods of surface activation is the small long-term effect of the surface treatment; the effect of the surface treatment inevitably declines after a while. This is not a convincing solution in view of the long service lives of typically several years which are to be allowed for in the case of domestic appliances, especially since it is generally not possible for the end user to refresh the hydrophilic properties of the turbidity sensor by renewed surface treatment.

SUMMARY OF THE INVENTION

Accordingly, an object of the invention is to provide a turbidity sensor for a water-bearing domestic appliance which is able in the long term to reduce the tendency to bubble adhesion in the regions of the outside surface of the sensor housing through which the measuring light beam passes.

In achieving this object, the invention starts from a turbidity sensor for a water-bearing domestic appliance, comprising a sensor housing having a housing main part and two housing projections protruding from the housing main part side by side and spaced apart from one another, wherein the two housing projections delimit between them a measuring channel for a liquid to be measured, and wherein the turbidity sensor is capable of emitting a measuring light beam at one of the housing projections along a measuring path which runs transversely through the measuring channel to the other housing projection. According to the invention, it is thereby provided that the measuring path crosses the measuring channel in the channel longitudinal direction remote from a point of smallest channel width of the measuring channel. Alternatively or in addition, it is provided according to the invention that the half-sections of the measuring channel that are located before and after a longitudinal midpoint of the measuring channel are configured so as to be unsymmetrical with respect to one another in terms of the channel width.

The invention is based on the idea of reducing the tendency to bubble adhesion in the regions of the outside surface of the housing projections through which the measuring light beam passes by suitably configuring the channel geometry of the measuring channel. In some embodiments, it is possible, by suitably configuring the channel geometry of the measuring channel, to generate or at least promote flow behavior of the liquid in the measuring channel such that, as a result of the flow, the tendency to bubble adhesion is reduced or any adhering bubbles are carried along by the flowing liquid itself. If the turbidity sensor is mounted, for example, on a collecting container which serves as the pump sump for a recirculating pump of a dishwasher, the dishwater in the pump sump is not immobile, at least during operation of the pump, but is moving. The turbidity sensor can thereby project into the pump sump with its two housing projections in such a manner that a flow of the dishwater through the measuring channel in the channel longitudinal direction occurs. This longitudinal flow can be so modified according to the invention, by suitably configuring the channel geometry of the measuring channel, that local turbulence occurs, for example, or/and the direction or/and spatial extent of a laminar flow region is established. It has been shown that influencing the flow of the liquid in the measuring channel in this manner can be suitable for lowering the tendency to bubble adhesion on the outside surface of the housing projections (at least where the measuring path crosses the outside surface of the housing projections).

A possible geometric feature of the measuring channel for achieving a suitable flow-influencing effect can be a local constriction at a longitudinal distance from a longitudinal midpoint of the measuring channel. In such a configuration, the measuring channel accordingly has a larger channel width (measured in a direction transverse to the channel longitudinal direction from one housing projection to the other) in the region of its longitudinal midpoint than in the region of the constriction. It is possible to speak of an eccentrically arranged channel constriction (i.e. eccentrically in relation to the channel longitudinal direction). In some embodiments, the measuring path can cross the measuring channel at a longitudinal distance from the constriction. In other embodiments, the measuring path can cross the measuring channel in the region of the constriction. Locating the measuring path at a longitudinal distance from the constriction can be advantageous in particular when the channel width at the constriction is not sufficiently large to achieve meaningful measurement results. For a meaningful measurement result, a specific minimum length of the liquid-measuring section may be required, that is to say of the section length over which the measuring light beam moves through the liquid to be measured. The necessary length of the liquid-measuring section can in some circumstances not be ensured at the constriction.

In some embodiments, the geometry of the measuring channel is so configured that the channel width of the measuring channel becomes increasingly smaller in the channel longitudinal direction starting from a first of its channel longitudinal ends as far as a constriction located on the other side of the longitudinal midpoint of the measuring channel.

In some embodiments, the geometry of the measuring channel is so configured that the channel width of the measuring channel, starting from a longitudinal midpoint of the measuring channel, increases in the direction towards a first channel longitudinal end and decreases in the direction towards an opposite second channel longitudinal end.

The measuring path can cross the measuring channel at a point which is located, in the channel longitudinal direction starting from the first channel longitudinal end, before the longitudinal midpoint or at least approximately in the region of the longitudinal midpoint of the measuring channel.

In some embodiments, the two housing projections, when seen from above, each have an approximately kidney-shaped outline. They thereby face one another with their outcurved kidney sides, but are tilted towards one another overall. As a result of the tilting, a constriction forms in the region of one of the kidney flanks, at which constriction the measuring channel has a smaller channel width than in the region of the middle of the outcurve and also in the region of the opposite kidney flank of the housing projections.

In the case of such a kidney-like outline configuration of the housing projections, the measuring path can cross the measuring channel at a point which is located, in the channel longitudinal direction, in the region of the middle of the outcurves of the two kidney-shaped outlines or is offset relative to the middle of the outcurve towards one kidney flank, at which the two kidney-shaped outlines are at a greater distance from one another than at their opposite kidney flank.

Alternatively or in addition to a suitable geometric configuration of the measuring channel, the tendency to bubble adhesion in the regions of the outside surface of the housing projections that are crossed by the measuring path can be reduced by reduced surface roughness. It is therefore provided in some embodiments that the sensor housing is a plastics injection-molded part which, at at least one of the housing projections, in the region of a light outlet point at which the measuring light beam passes through the housing projection in question, has a lower roughness, expressed in particular by a lower mean roughness index, of the outside surface than in surrounding regions of the outside surface of the housing projection in question. The reduced roughness can be achieved, for example, by local smoothing of the injection mold with which the sensor housing is injection molded.

According to a further aspect, the invention provides a water-bearing domestic appliance, in particular a dishwasher, wherein the domestic appliance comprises a water-collecting chamber (e.g. pump sump) and also a turbidity sensor of the type discussed above. The turbidity sensor is fitted into the domestic appliance in such a manner that its housing projections project into the water-collecting chamber and a flow of water through the measuring channel in the channel longitudinal direction is ensured during operation of the domestic appliance. It will be appreciated that a turbidity sensor according to the invention can of course also be used in wet chambers in which the liquid to be measured is comparatively immobile and therefore no, or at least no significant, longitudinal flow of the liquid in the measuring channel occurs.

The invention will be explained further hereinbelow with reference to the accompanying drawings.

BRIEF DESCRIPTION OF THE DRAWINGS

FIG. 3a is a perspective view of a turbidity sensor according to an exemplary embodiment according to the invention.

FIG. 3b is a plan view of a "wet side" of the turbidity sensor of FIG. 3a.

DETAILED DESCRIPTION OF THE INVENTION

Figure 1:
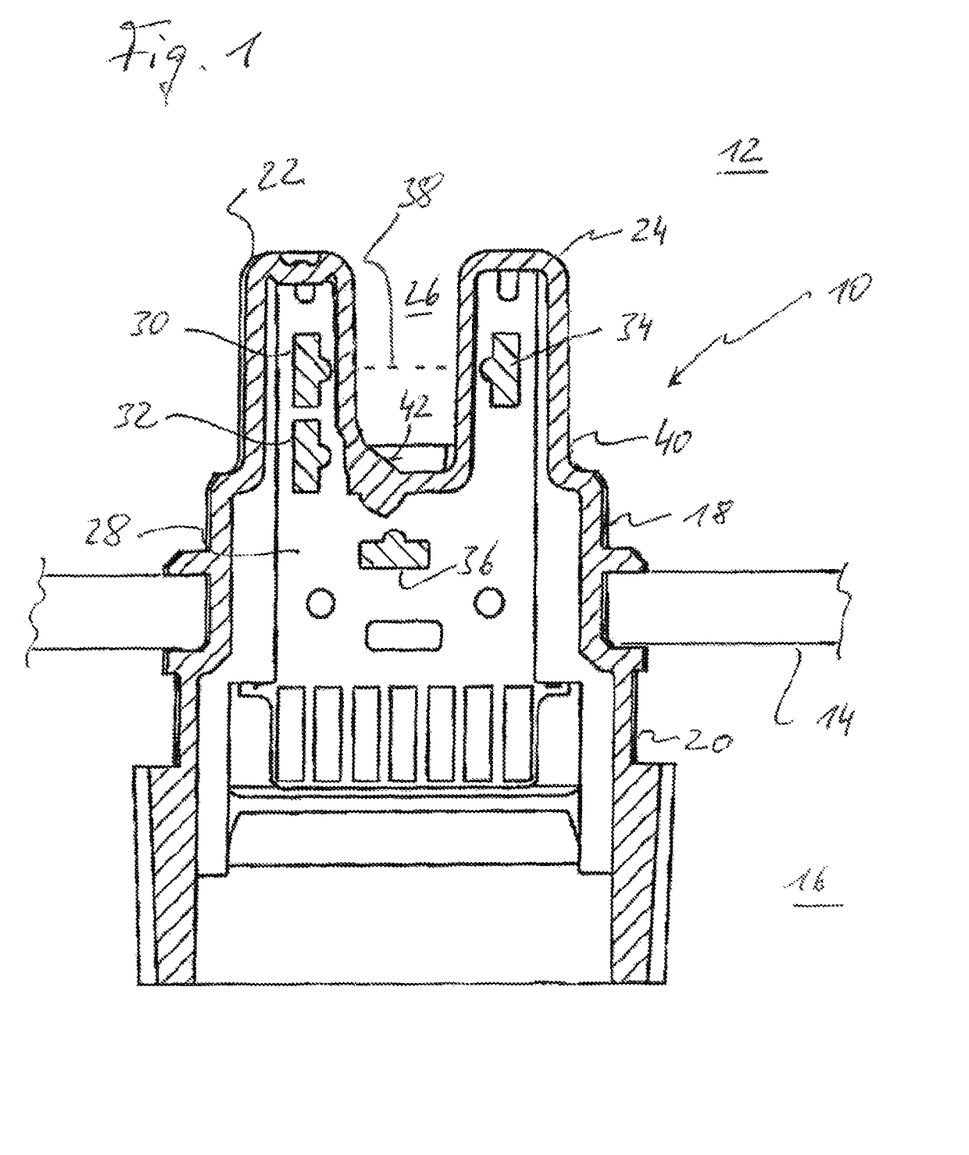
FIG. 1 shows, in section, an exemplary embodiment of a turbidity sensor for use in a water-bearing domestic electrical appliance.

Reference will first be made to FIG. 1. The turbidity sensor shown therein, designated generally 10, makes it possible for turbidity measurements to be carried out on a water-containing liquid present in a wet chamber 12 and additionally offers a foam detection function. The latter function is purely optional and can readily be omitted. It is merely important for the turbidity sensor 10 to be suitable for carrying out turbidity measurements.

The wet chamber 12 is separated from a dry region 16 by a mounting wall 14. The turbidity sensor 10 is inserted into an opening in the mounting wall 14 and held therein by clamping structures (e.g. in the form of snap hooks or clamping tongues) which are not explained in detail here but are known per se among experts. In the case of a domestic dishwasher, the mounting wall 14 is, for example, the container wall of a collecting container which forms a pump sump and is arranged directly beneath the dish chamber (dishwashing chamber) of the dishwasher and in which the dishwater collects after it has been sprayed into the dish chamber and has run out of the dish chamber through a filter screen arrangement in the bottom of the dish chamber. In the case of a domestic washing machine, the wet chamber 12 is, for example, the interior of a liquor container (wash tub) in which a washing drum is accommodated in a rotatable manner. The liquid in the wet chamber 12 is accordingly, for example, part of the dishwashing liquor of a dishwasher or part of the washing liquor of a washing machine.

The turbidity sensor 10 has a sensor housing 18 which is manufactured, in particular injection molded, from a light-permeable plastics material and which in the example shown has an approximately cup-shaped housing main part 20, from which a plurality of housing projections 22, 24 (here two) in the form of elongate, finger-like protuberances protrude into the wet chamber 12. In the example shown, in addition to the housing projections 22, 24 (also referred to as housing fingers hereinbelow), the housing main part 20 also protrudes slightly into the wet chamber 12. The two housing fingers 22, 24 protrude from the housing main part 20 approximately parallel to one another and spaced apart from one another and delimit between them a measuring space 26, which is also referred to as a measuring channel hereinbelow and has a channel longitudinal direction running perpendicularly to the plane of the drawing of FIG. 1.

A printed circuit board 28 is accommodated in the sensor housing 18, on which printed circuit board there are mounted at least one light emitter, for example of the LED type, and at least one light receiver, for example in the form of a photodiode. In the example shown, the printed circuit board 28 is equipped with two light emitters 30, 32 and with two light receivers 34, 36. The light emitter 30 and the light receiver 34 form a first cooperating pair of optoelectronic components, the light emitter 32 and the light receiver 36 form a further such pair. In the example shown, the emitter/receiver pair 30, 34 serves for turbidity measurements, that is to say for measuring the turbidity of the liquid in the wet chamber 12. The other emitter/receiver pair 32, 36 serves for foam measurements. Since—as explained—the function of foam measurement can be dispensed with, the emitter/receiver pair 32, 36 can readily be omitted.

The measuring light emitted by the light emitter 30 passes in the form of a collimated beam (measuring light beam) through the measuring channel 26 along a measuring path 38 (indicated in FIG. 1 by a broken line). The measuring path 38 crosses the measuring channel 26 in the channel transverse direction from a light exit point at which the measuring light beam leaves one of the housing fingers (here housing finger 22) to a light entry point at which the measuring light beam enters the other of the housing fingers again (see housing finger 24). In the section in which the measuring path 38 runs through the wet chamber 12, more specifically through the measuring channel 26, the measuring light beam experiences a more or less pronounced attenuation according to the turbidity of the liquid located in the wet chamber 12. In the example shown, the light emitter 30 is arranged within the housing finger 22, and the light receiver 34 is likewise arranged within the housing finger 24. The printed circuit board 28 accordingly extends with finger-like prolongations into the housing fingers 22, 24. In a modified embodiment, the light emitter 30 and the light receiver 34 can be relocated from the housing fingers 22, 24 into the housing main part 20. For light guiding, a suitable light-guiding structure, for example in the form of one or more transparent solid light-guiding bodies, can be accommodated in the sensor housing 18. The light-guiding structure guides the light radiated by the light emitter 30 into the housing finger 22 and—after the measuring light beam, after passing through the measuring channel 26, has entered the housing finger 24 again—guides the collected measuring light from the housing finger 24 to the light receiver 34.

For the foam measurement by means of the emitter/receiver pair 32, 36, the housing wall—designated 40 in FIG. 1—of the sensor housing 18 forms a boundary surface 42 at the outside of the housing, which boundary surface is configured as a planar surface and is oriented at an oblique angle relative to the beam axis of the light beam of the light emitter 32 incident thereon. In the case where pure air is located in the wet chamber 12 adjoining the boundary surface 42, the boundary surface 42 has a totally reflecting action. In the case of pure liquid, that is to say the boundary surface 42 is completely wetted with a bubble-free liquid, the boundary surface 42 has a transmitting action. In the case of foam, that is to say the portion of the wet chamber 12 adjoining the boundary surface 42 is filled with foam, some light components are totally reflected at the boundary surface 42, while other light components emerge at the boundary surface 42 into the wet chamber 12. Depending on the intensity of the light received by the light receiver 36, a conclusion can be made as to the nature of the medium located in the wet chamber 12, that is to say air, foam or liquid.

Figure 2:
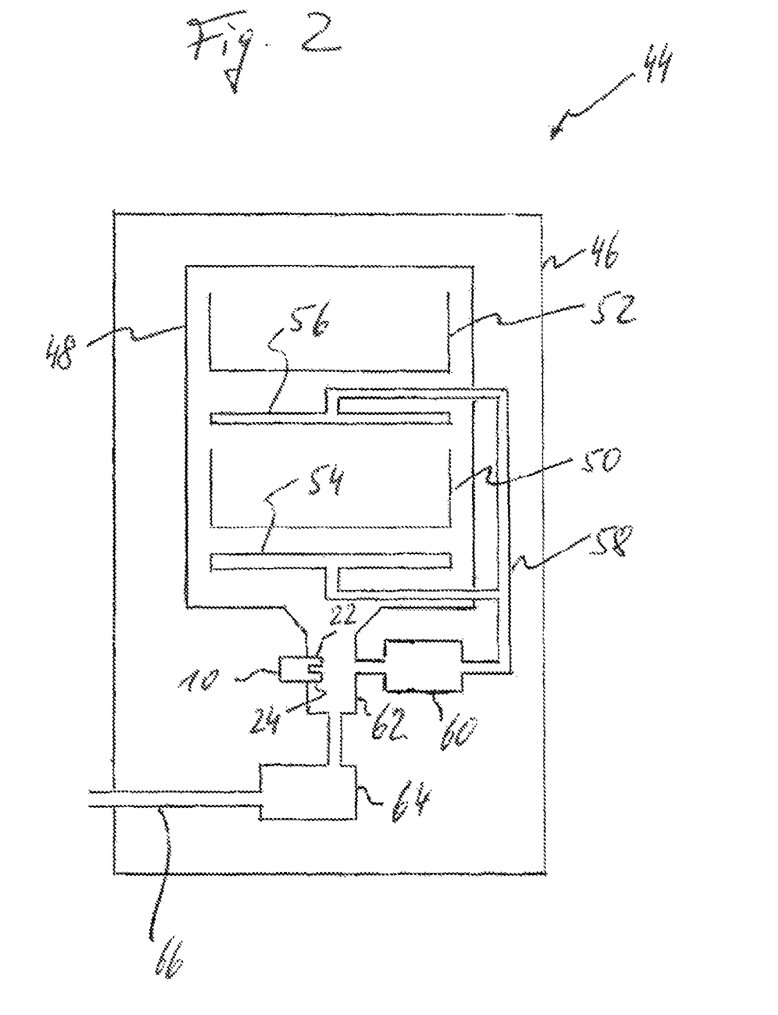
FIG. 2 shows, schematically, a domestic dishwasher according to an exemplary embodiment.
Figure 2A:
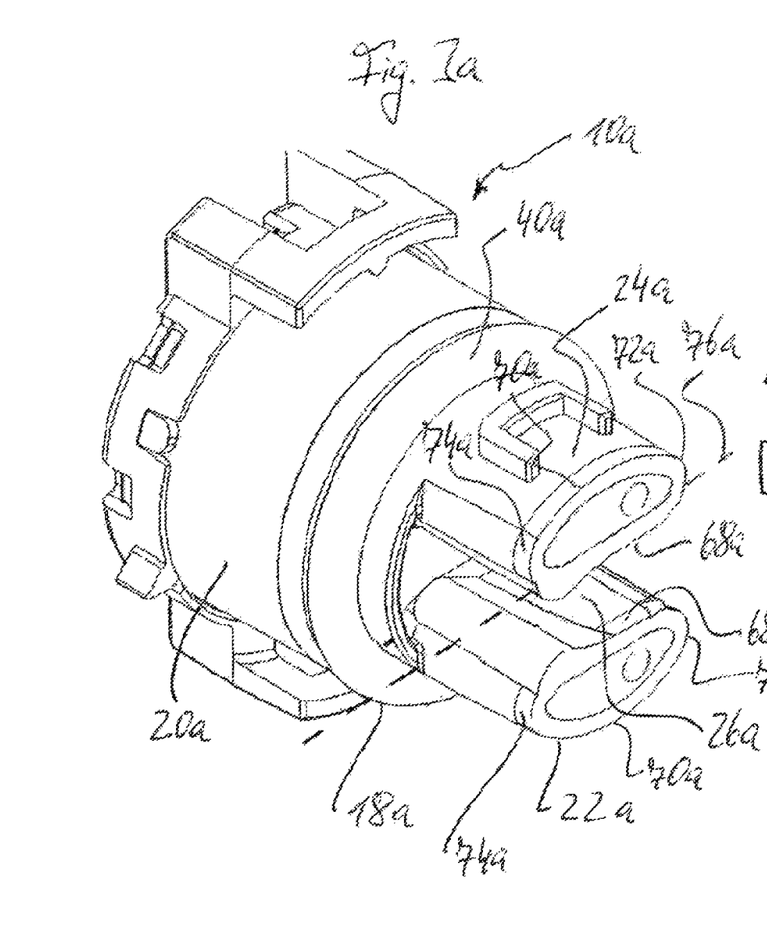

Reference will now be made to FIG. 2. The dishwasher shown therein, designated generally 44, forms a possible use environment for a turbidity sensor according to the invention, for example the turbidity sensor 10 of FIG. 1. The dishwasher 44 comprises a machine body 46 in which a dishwashing chamber 48 is formed. In a manner known per se there are accommodated in the dishwashing chamber 48—guided in such a manner that they can be pulled out on rails—a lower dish rack 50 and an upper dish rack 52. Spray arms 54, 56 are provided for spraying dishwashing water into the dishwashing chamber 48 in order to clean the dishes accommodated in the dish racks 50, 52. Dishwashing water is fed to the spray arms 54, 56 via a feed line system 58, which dishwashing water is pumped into the feed line system 58 by a recirculating pump 60. The recirculating pump 60 draws the dishwashing water from a collecting container 62 serving as a pump sump, which collecting container is located beneath the dishwashing chamber 48 and is conventionally separated from the dishwashing chamber 48 by a filter screen arrangement, not shown in detail. The turbidity sensor 10 is fitted into the container wall of the collecting container 62, namely in such a manner that the housing fingers 22, 24 project into the pump sump 62. Waste water can be pumped from the dishwasher 46 into a drainage hose 66 via a drain pump 64.

During recirculating operation of the recirculating pump 60, the liquor in the pump sump 62 is constantly moving. The turbidity sensor 10 is fitted in such a manner that, at least during recirculating operation, a flow of the dishwashing water located in the pump sump generally in the direction of the longitudinal extent of the measuring channel 26, that is to say, looking at FIG. 1, in a direction perpendicular to the plane of the drawing of FIG. 1, is established in the measuring channel 26 of the turbidity sensor 10. For a high measurement quality, it is important to keep those regions of the outside surface of the housing wall 40 of the sensor housing 18 at which the measuring light beam emerges from the housing finger 22 into the measuring channel 26 and, after passing through the measuring channel 26, enters the housing finger 24 as free as possible from interfering air bubbles which collect on the outside surface of the sensor housing 18 and can adhere thereto. It is often not possible to achieve this with the desired longevity solely by surface activation and establishing good wettability of the outside surface of the sensor housing 18. In the case of the turbidity sensor 10, the geometry of the measuring channel 26 is therefore suitably configured to influence in a targeted manner the flow behavior of the liquid to be measured—when the liquid flows through the measuring channel 26. Such a measure is the production of a channel constriction, which locally increases the flow speed, at a point at a longitudinal distance from the middle of the measuring channel 26, as seen in the channel longitudinal direction. Reference will now additionally be made in this respect to FIGS. 3a and 3b.

Figure 3B:
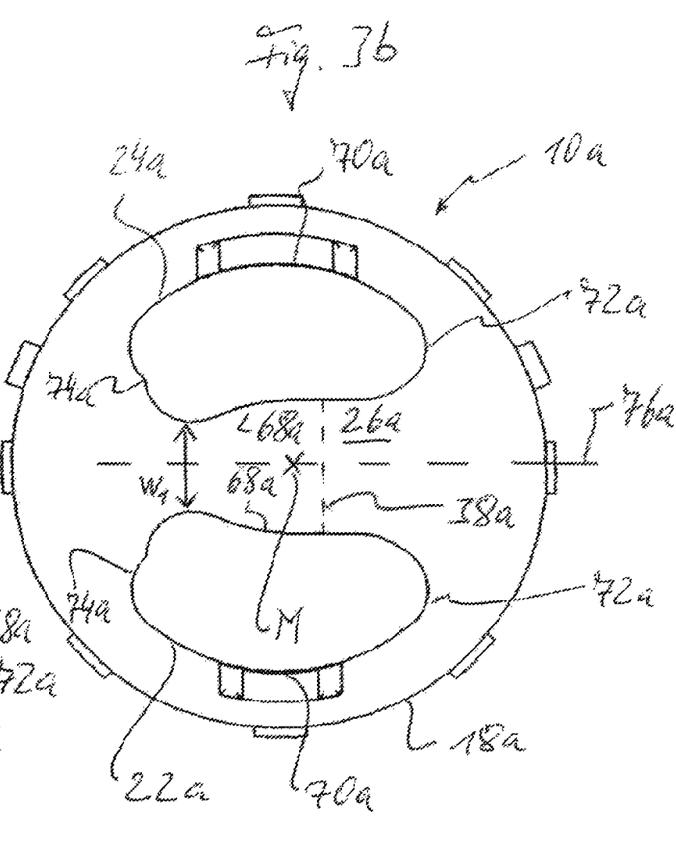

In the exemplary embodiment shown in these two figures, elements which are the same or have the same effect are provided with the same reference numerals as in FIG. 1 but with the addition of a lowercase letter. Unless indicated otherwise hereinbelow, reference is made to the statements made hereinbefore for the explanation of such elements which are the same or have the same effect.

Especially in FIG. 3b, which is a plan view of the free ends of the housing fingers 22a, 24a around which the liquid to be measured flows during use, that is to say a plan view of the "wet" side of the sensor 10a, the approximately kidney-shaped contour of the housing fingers 22a, 24a can be seen. According to this kidney-shaped outline, the housing fingers 22a, 24a each have a front side 68a, which in the example shown is slightly concavely curved (and which can alternatively be substantially linear in form), a convexly curved rear side 70a, and kidney flanks 72a, 74a at the two opposite transitions between the front side 68a and the rear side 70a. The housing fingers 22a, 24a are arranged with their front sides 68a facing one another, wherein they are, however, tilted slightly towards one another, so that the measuring channel 26a is wider, that is to say has a larger channel width, in the region of one of the kidney flanks of the housing fingers 22a, 24a (here in the region of the kidney flanks 72a) than in the region of the other of the kidney flanks (here in the region of the kidney flanks 74a). In the region of the kidney flanks 74a, the measuring channel 26a has a point of smallest channel width (overall constriction), at which the channel width has a value $w_1$. It can clearly be seen in FIG. 3b that this overall constriction is remote from a longitudinal midpoint M which divides the measuring channel 26a into two half-sections of equal length in the channel longitudinal direction. A longitudinal axis of the measuring channel 26a is depicted by a broken line in FIGS. 3a, 3b and designated 76a. The overall constriction with channel width $w_1$ is located in the exemplary embodiment of FIGS. 3a, 3b in the region of a longitudinal end of the measuring channel 26a. Starting from this overall constriction, the channel width increases substantially continuously in the direction towards the longitudinal midpoint M and therebeyond as far as the opposite longitudinal end of the measuring channel 26a, so that the measuring channel 26a can be thought of to a certain extent as a funnel channel.

Overall, the measuring channel 26a consequently has an unsymmetrical profile of its channel width in the channel longitudinal direction.

The measuring path 38a crosses the measuring channel 26a at a point at a longitudinal distance from the longitudinal end of the measuring channel 26a at which the measuring channel 26a has the constriction with channel width $w_1$. In FIG. 3b, it will be seen that the measuring path 38a crosses the measuring channel 26a—as seen from the location of the constriction with channel width $w_1$—even on the other side of the longitudinal midpoint M, that is to say after the longitudinal midpoint M. It has been shown that, with a channel geometry as shown in FIGS. 3a, 3b, bubble adhesion to the outside surface of the housing fingers 22a, 24a in the region of the measuring path 38a can be markedly reduced in comparison with a configuration in which the measuring channel 26a has substantially the same channel width over its entire channel length. According to the findings of the inventors, this is associated with a changed flow pattern of the liquid in the measuring channel 26a as compared with a constant channel cross-section. In this respect, reference is made for the purpose of exemplary illustration to FIGS. 4a to 4c and also to FIGS. 5a to 5c.

Figure 4A:
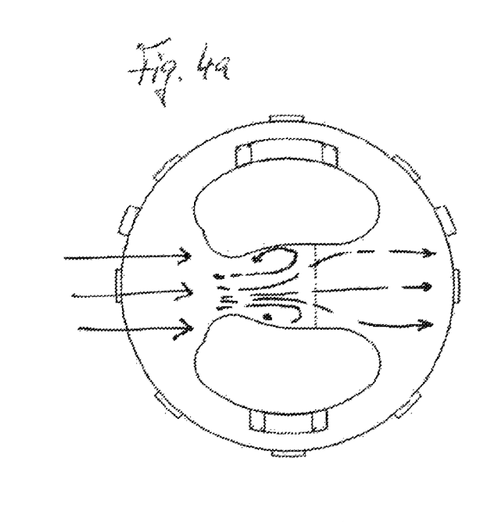
FIGS. 4a to 4c show an example of a flow pattern of a liquid flowing through the measuring channel of the turbidity sensor of FIGS. 3a, 3b in a first direction.
Figures 4B, 4C:
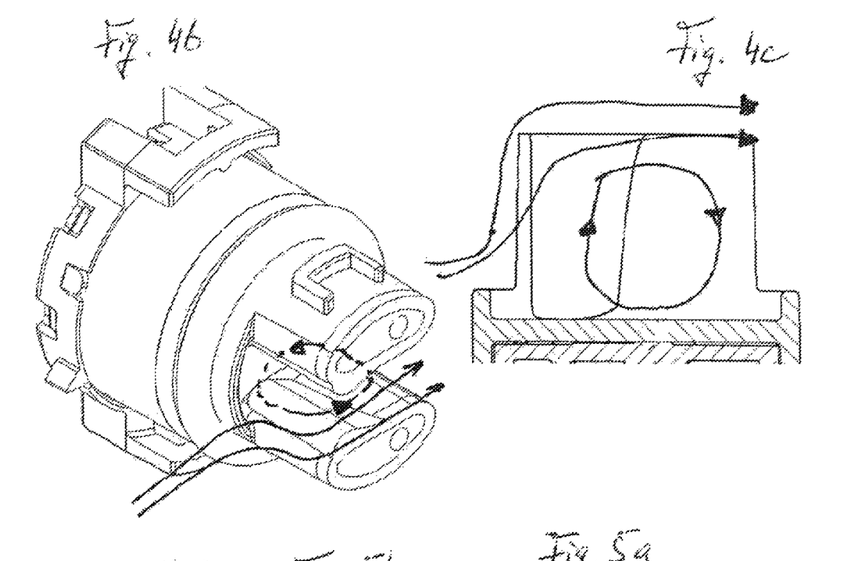
Figure 5A:
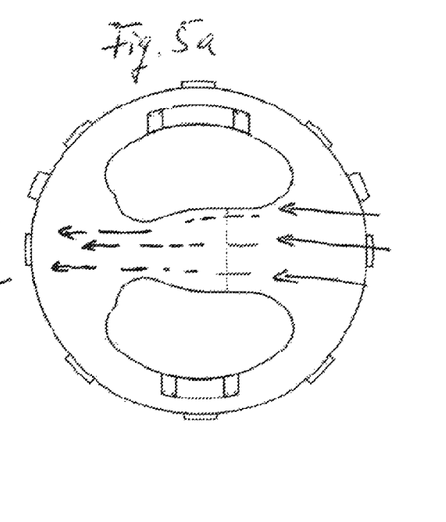
FIGS. 5a to 5c show an example of a flow pattern of a liquid flowing through the measuring channel of the turbidity sensor of FIGS. 3a, 3b in an opposite second direction.
Figure 5B:
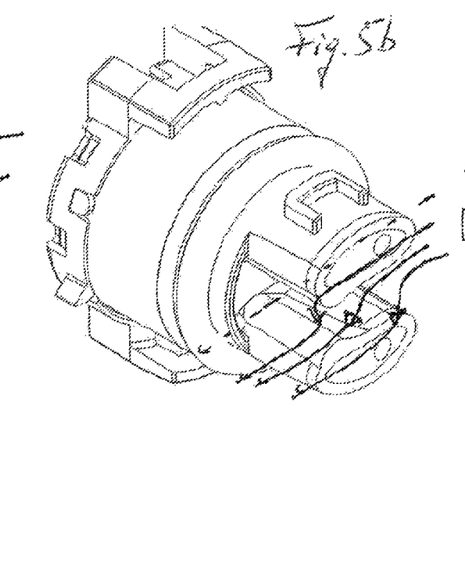
Figure 5C:
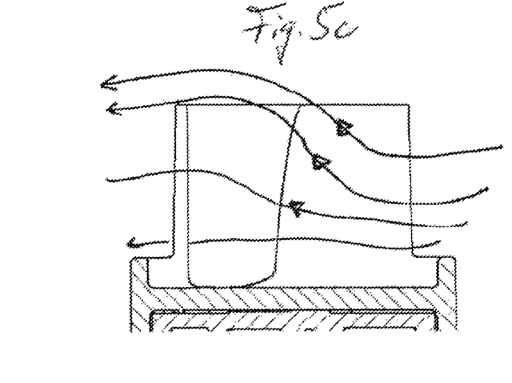

FIGS. 4a and 5a are plan views corresponding to FIG. 3b, FIGS. 4b and 5b are perspective views corresponding to FIG. 3a. Finally, FIGS. 4c and 5c show a longitudinal section through the measuring channel 26a of the turbidity sensor 10a of FIGS. 3a, 3b. In all FIGS. 4a to 5c, reference numerals have been omitted for reasons of clarity; the turbidity sensor 10a of FIGS. 3a, 3b is shown in each case. On the other hand, flow arrows have been depicted in FIGS. 4a to 5c in order to illustrate schematically the flow pattern of the liquid flowing in the measuring channel 26a.

FIGS. 4a to 4c start from the set-up in which a liquid flows through the measuring channel 26a in the direction from the narrower longitudinal end (where the overall constriction with channel width $w_1$ is located) to the opposite wider end of the measuring channel 26a. It will be seen, by means of the flow arrows, that, according to the findings of the inventors, turbulence can occur with this direction of flow through the channel, which can result in a rotating vortex within the measuring channel 26a. FIGS. 5a to 5c, on the other hand, start from the reverse set-up in which a liquid thus flows through the measuring channel 26a in the direction from the wider longitudinal end to the narrower longitudinal end. It will again be seen, by means of the flow arrows, that, at least according to the findings of the inventors, although the flow can remain largely laminar, the individual flow layers can expand in a direction transverse to the channel width, that is to say a transport of liquid material in the direction high-low can occur in the measuring channel 26a. According to the findings of the inventors, a reduced adhesion of air bubbles to the housing surface in the region of the measuring channel 26a can be observed with both set-ups, wherein, in the opinion of the inventors, the increase in the flow speed caused by the constriction and the changed flow pattern compared to a channel of constant width are responsible for the reduced bubble adhesion.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A turbidity sensor for a water-bearing domestic appliance, the turbidity sensor comprising:
a sensor housing having a housing main part and two housing projections protruding from the housing main part side by side and spaced apart from one another,
wherein the two housing projections delimit between them a measuring channel for a liquid to be measured,
wherein the turbidity sensor is configured to emit a measuring light beam at one of the housing projections along a measuring path which runs transversely through the measuring channel to the other housing projection, and
wherein the turbidity sensor satisfies one or more of the following conditions:
the channel width of the measuring channel becomes increasingly smaller in the channel longitudinal direction starting from a first of its channel longitudinal ends as far as a constriction located on the other side of the longitudinal midpoint of the measuring channel; or
the channel width of the measuring channel, starting from a longitudinal midpoint of the measuring channel, increases in the direction towards a first channel longitudinal end and decreases in a direction towards an opposite second channel longitudinal end.

2. The turbidity sensor as claimed in claim 1, wherein the measuring path crosses the measuring channel at a point which is located, in the channel longitudinal direction starting from the first channel longitudinal end, before the longitudinal midpoint or at least approximately in the region of the longitudinal midpoint of the measuring channel.

3. The turbidity sensor as claimed in claim 1, wherein the measuring path crosses the measuring channel at a point which is located, in the channel longitudinal direction, in the region of the middle of the outcurves of the two kidney-shaped outlines or is offset relative to the middle of the outcurve towards one kidney flank, at which the two kidney-shaped outlines are at a greater distance from one another than at their opposite kidney flank.

4. A turbidity sensor for a water-bearing domestic appliance, the turbidity sensor comprising:
a sensor housing having a housing main part and two housing projections protruding from the housing main part side by side and spaced apart from one another,
wherein the two housing projections delimit between them a measuring channel for a liquid to be measured,
wherein the turbidity sensor is configured to emit a measuring light beam at one of the housing projections along a measuring path which runs transversely through the measuring channel to the other housing projection,
wherein the sensor housing is a plastics injection-molded part which, at at least one of the housing projections in the region of a light outlet point at which the measuring light beam passes through the housing projection in question, has a lower roughness of the outside surface than in surrounding regions of the outside surface of the housing projection in question.

5. A water-bearing domestic appliance comprising:
a wet space; and
a turbidity sensor,
wherein the turbidity sensor comprises a sensor housing having a housing main part and two housing projections protruding from the housing main part side by side and spaced apart from one another,
wherein the two housing projections delimit between them a measuring channel for a liquid to be measured,
wherein the turbidity sensor is configured to emit a measuring light beam at one of the housing projections along a measuring path which runs transversely through the measuring channel to the other housing projection,
wherein the turbidity sensor is fitted into the domestic appliance in such a manner that its housing projections project into the wet space and a flow of water through the measuring channel in the channel longitudinal direction is ensured during operation of the domestic appliance, and
wherein the turbidity sensor satisfies one or more of the following conditions:
the channel width of the measuring channel becomes increasingly smaller in the channel longitudinal direction starting from a first of its channel longitudinal ends as far as a constriction located on the other side of the longitudinal midpoint of the measuring channel; or
the channel width of the measuring channel, starting from a longitudinal midpoint of the measuring channel, increases in the direction towards a first channel longitudinal end and decreases in a direction towards an opposite second channel longitudinal end.

6. The water-bearing domestic appliance as claimed in claim 5, wherein the turbidity sensor also satisfies one or more of the following additional conditions:
the measuring path crosses the measuring channel in a channel longitudinal direction remote from a point of smallest channel width of the measuring channel;
half-sections of the measuring channel that are located before and after a longitudinal midpoint of the measuring channel are configured so as to be unsymmetrical with respect to one another in terms of the channel width;
the measuring channel has a constriction at a longitudinal distance from its longitudinal midpoint, at which constriction the channel width is smaller than in the region of the longitudinal midpoint; or
the two housing projections each have, when seen from above, an approximately kidney-shaped outline and face one another with their outcurved kidney sides, wherein the two kidney outlines are tilted towards one another.

7. The turbidity sensor as claimed in claim 1, wherein the turbidity sensor also satisfies one or more of the following additional conditions:
the measuring path crosses the measuring channel in a channel longitudinal direction remote from a point of smallest channel width of the measuring channel;
half-sections of the measuring channel that are located before and after a longitudinal midpoint of the measuring channel are configured so as to be unsymmetrical with respect to one another in terms of the channel width;
the measuring channel has a constriction at a longitudinal distance from its longitudinal midpoint, at which constriction the channel width is smaller than in the region of the longitudinal midpoint; or
the two housing projections each have, when seen from above, an approximately kidney-shaped outline and face one another with their outcurved kidney sides, wherein the two kidney outlines are tilted towards one another.

* * * * *